(12) United States Patent
Hussain et al.

(10) Patent No.: US 8,601,884 B2
(45) Date of Patent: Dec. 10, 2013

(54) CORIOLIS MASS FLOWMETER HAVING A PAIR OF OSCILLATION NODE PLATES FIXABLY MOUNTED TO MEASURING TUBES

(75) Inventors: Yousif Hussain, Weston Favell (GB); Tao Wang, Uxbridge (GB); Chris Rolph, Northants (GB); Neil Harrison, Duston (GB)

(73) Assignee: Krohne AG (CH)

( * ) Notice: Subject to any disclaimer, the term of this patent is extended or adjusted under 35 U.S.C. 154(b) by 247 days.

(21) Appl. No.: 13/090,402

(22) Filed: Apr. 20, 2011

(65) Prior Publication Data

US 2011/0209561 A1    Sep. 1, 2011

Related U.S. Application Data

(62) Division of application No. 12/108,750, filed on Apr. 24, 2008, now Pat. No. 7,971,494.

(30) Foreign Application Priority Data

Apr. 25, 2007 (DE) .......................... 10 2007 019 852

(51) Int. Cl.
*G01F 1/84* (2006.01)
(52) U.S. Cl.
USPC ...................................................... 73/861.355
(58) Field of Classification Search
None
See application file for complete search history.

(56) References Cited

U.S. PATENT DOCUMENTS 6,308,580 B1 * 10/2001 Crisfield et al. .......... 73/861.355
2004/0045369 A1 * 3/2004 Bitto et al. ................ 73/861.18

* cited by examiner

*Primary Examiner* — Harshad R Patel
(74) *Attorney, Agent, or Firm* — Cesari and McKenna, LLP

(57) ABSTRACT

A Coriolis mass flowmeter having two measuring tubes, wherein two neighboring oscillation node plates are provided on one end of the measuring tube that connect the two measuring tubes to one another and wherein the angle between the planes of both oscillation node plates is determined in such a manner that the vibration of the measuring tubes is minimal up to a predetermined driving force. A method of producing the flowmeter is also disclosed.

6 Claims, 5 Drawing Sheets

CORIOLIS MASS FLOWMETER HAVING A PAIR OF OSCILLATION NODE PLATES FIXABLY MOUNTED TO MEASURING TUBES

CROSS-REFERENCE TO RELATED APPLICATIONS

The present application is a division of Ser. No. 12/108,750, filed on Apr. 24, 2008, now U.S. Pat. No. 7,971,494.

BACKGROUND OF THE INVENTION

The invention relates to a Coriolis mass flowmeter with a measuring tube that can be excited into oscillation, an oscillation driver and/or an oscillation sensor, wherein the oscillation. driver and/or the oscillation sensor has a permanent magnet.

Mass flowmeters that work according to the Coriolis principle generally have at least one oscillation driver that excites the measuring tube into oscillation as well as two oscillation sensors, which register the achieved oscillation of the measuring tube. The determination of the mass flow is then definable, e.g. using the phase shift of the achieved oscillations between the two oscillation sensors.

The oscillation driver and oscillation sensors are generally assembled in such a manner that they have a permanent magnet as well as a magnetic coil in order to vibrate the measuring tube or, respectively register the oscillations of the measuring tube in an electrical manner. In order to attach the permanent magnet to the oscillation driver or, respectively, the oscillation sensors, it is generally provided with a hole so that it can be affixed with a screw lead through the hole. However, the magnetic field is negatively influenced by this sort of mounting screw. In addition, the permanent magnet is exposed practically without any defense mechanism to mechanical external influences such as bumping during transport or during installation, so that damage of the Coriolis mass flowmeter cannot be ruled out.

SUMMARY OF THE INVENTION

It is the object of the invention to specify such a Coriolis mass flowmeter that has an oscillation driver and/or an oscillation sensor having an effectively useful permanent magnet.

Based on the Coriolis mass flow meter described above, this object is met in that the permanent magnet is provided in a magnet holder.

It is thus provided according to the invention, that the permanent magnet is inserted in a device provided solely for its mounting, namely the magnet holder. For this reason, the permanent magnet is at least partially enclosed by the magnet holder according to the invention, which acts as protection against external influences, such as bumping. Furthermore, the fixation of the permanent magnet is realized by the magnet holder at least partially enclosing it, so that the permanent magnet does not need to be provided with a hole for the mounting screw.

Basically, the permanent magnet can be affixed in the magnet holder in various ways, e.g. using adhesion. However, according to a preferred development of the invention, it is provided that the permanent magnet is form-locked and/or friction-locked into the magnet holder. This facilitates the installation since no further means are required for affixing the permanent magnet.

Furthermore, it is provided according to a preferred development of the invention that the magnet holder is formed in such a manner that the permanent magnet is affixed in all directions. For that purpose, it can be provided according to a preferred development of the invention that the magnet holder has a receptacle for the permanent magnet wherein the permanent magnet is preferably held in this receptacle by means of a catch mechanism, In this manner, the installation of the permanent magnet is particularly simple, since the permanent magnet is simply slid into the magnet holder, namely until it reaches the mentioned catch so that the permanent magnet is held in the magnet holder.

In this context, it is particularly provided according to a preferred development that the magnet holder have at least one flexible wall, preferably multiple flexible walls. In this manner, the installation is further simplified since the flexible walls on which the catch mechanism are preferably found can give way when sliding in the permanent magnet, so that less force is required to affix the permanent magnet.

Generally, the magnet holder can have different geometrical forms, According to a preferred development of the invention, however, it is provided that the magnet holder is formed as a hollow cylinder in which the permanent magnet is inserted. At the same time, it is provided according to a further development of the invention that the permanent magnet is also cylinder-shaped, namely, having dimensions so that it can be arranged within the magnet holder with a snug fit.

The magnet holder can be made of different materials. However, it is provided by a further development of the invention, that the magnet holder consists of plastic. In this context, it is additionally provided by a further development of the invention that the oscillation driver and/or the oscillation sensor has a holding device that is connected using force fit. A force fit of this type is producible in such a manner that at least one plastic peg formed on the magnet holder is placed in one of the holes provided on the holding device and is led through it in order to heat the end lead through the hole of the holding device. and to provide it with a crown, which prevents it from sliding out of the hole, so that fixation of the magnet holder to the holding device is achieved.

Further, the invention relates to a Coriolis mass flowmeter having exactly two measuring tubes that can be excited to oscillation and a housing, wherein an end connection plate from one pipe to both of the measuring tubes is provided on the ends of the measuring tubes.

Mass flowmeters that work according to the Coriolis-principle frequently have two measuring tubes running parallel to one another, which are generally inversely excited to oscillation.

This has the advantage that the center of mass of the entire measuring device remains constant during operation, which reduces oscillation coupling with the process pipeworks in which the mass flowmeter is installed, which is, in turn, advantageous for the signal-to-noise ratio. For that reason, in a Coriolis mass flowmeter of this type having two measuring tubes, it is necessary to split the flow, namely from the one pipe of the process pipeworks in which the Coriolis mass flowmeter is installed to both measuring tubes. For this purpose, an end connection plate is provided on both ends of the Coriolis mass flowmeter. The beginning and the end of the measuring tube are defined by these end connection plates.

Something similar is shown, e.g. in US 2004/0045369 A1, wherein a thick-walled housing is provided that connects both connection plates with one another in order to isolate the vibration of the measuring tubes from the process pipeworks in which the mass flowmeter is installed. This leads, in fact, to good isolation of oscillation of the Coriolis mass flowmeter and therewith, to a good signal to noise ratio, but the Coriolis mass flowmeter becomes very heavy in this manner.

It is thus the object of the invention to specify such a Coriolis mass flowmeter that has only low weight while having good oscillation isolation and a correspondingly good signal-to-noise ratio.

Based on the Coriolis mass flowmeter described above, this object is met in that the end connection plates are connected to one another by means of a reinforcing bridge unrelated to the housing.

According to the invention, the function of the reinforcing bridge for oscillation isolation of the Coriolis mass flowmeter and the function of the housing for mechanical protection of the measuring tubes and other components housed in the housing of the Coriolis mass flowmeter are kept separate. This makes it possible to provide a lightweight housing of, e.g. plastic, while the reinforcing bridge is formed just strong and solid enough that the required oscillation isolation can be achieved.

For that reason, it is provided by a further development of the invention that the measuring tubes are arranged completely outside of the reinforcing bridge. In particular, it is provided by a further development of the invention that the reinforcing bridge be plate-shaped and run parallel thereby, e.g. at least sectionally to both measuring tubes.

Basically, the reinforcing bridge can be formed as a solid component, e.g., a solid plate. However, according to a preferred development of the invention, it is provided that the reinforcing bridge is hollow. Thereby, the reinforcing bridge can basically be formed as a pipe; however, it is provided by a preferred development of the invention that the reinforcing bridge has a rectangular cross section, in particular is formed as a hollow plate. This preferred development of the invention forms the basis of the insight that a solid plate is only slightly stiffer than a hollow plate, however significantly heavier. A reduction in the weight of the Coriolis mass flowmeter is achieved in this manner.

In addition, the invention relates to a Coriolis mass flowmeter having exactly two measuring tubes that can be excited to oscillation, wherein there is an end connection plate from one pipe to both measuring tubes and additionally an adapter for connection to a process pipeworks on each end of the measuring tubes. It is a matter of a Coriolis mass flowmeter as described above that additionally has an adapter, such as a flanged connection.

Until now, the course of action has been to produce a separate connection plate and a separate adapter, which are then joined at one end of the Coriolis mass flowmeter, e.g. using welding. However, this is relatively complex in the assembly of the Coriolis mass flowmeter.

Thus, it is also the object of the invention to provide such a Coriolis mass flowmeter that is easy to assemble.

Based on the Coriolis mass flowmeter described above, this object is met in that the end connection plates and the adapters are assembled of one common component.

Further, the invention relates to a Coriolis mass flowmeter having a measuring tube that can be excited to oscillation, a housing enclosing the measuring tube and an electronic converter.

The signals registered by the oscillation sensor of the Coriolis mass flowmeter are conveyed to the converter so that a mass flow signal can be determined and displayed by the converter. Until now, the course of action has been to have the actual data receiver, i.e. the device in the area if the measuring tube, be separated from the actual converter. Namely, the converter is frequently provided in an attachment that is placed on the receiver. However, this makes the Coriolis mass flowmeter relatively unwieldy.

Thus, it is the object of the invention to provide such a Coriolis mass flowmeter that is easily assembled and easily manageable.

Based on the Coriolis mass flowmeter described above, this object is met in that the electronic converter is provided completely within the housing of the Coriolis mass flowmeter.

According to the invention, the result is a very compact Coriolis mass flowmeter that can be easily carried and installed.

The invention further relates to a Coriolis mass flowmeter having two measuring tubes, wherein two neighboring oscillation node plates are provided, which connect the two measuring tubes to one another.

Oscillation node plates of this type are known from the previously mentioned US 2004/0045369 A1 and U.S. Pat. No. 6,308,580 B1. These oscillation node plates define the effective oscillation length of the measuring tube and serve the purpose of preventing a coupling of the oscillation of the measuring tube onto the process pipeworks in which the Coriolis mass flowmeter is installed. Here, this is backed up, in particular, by not just one oscillation node plate on one side of the measuring tube being provided, but two oscillation node plates neighboring one another.

However, it has been discovered that, in general, partial vibration of the measuring tube is transmitted to the process pipeworks even when two neighboring oscillation node plates are provided on one side of the measuring tube.

Thus it is also the object of the invention to provide such a Coriolis mass flowmeter having better oscillation isolation from the process pipeworks in which the Coriolis mass flowmeter is installed.

This object is met based on the Coriolis mass flowmeter described above in that the angle between the planes of both oscillation node plates is chosen so that the vibration of the measuring tube is minimal at a predetermined driving force.

According to this aspect of the invention, it is also provided that such an optimized angle is provided between both planes of the oscillation node plates that minimum vibrations of the measuring tube are achieved. The coupling between the oscillation of the measuring tube and the oscillation of the process pipeworks result, namely, from these vibrations and thus, better oscillation isolation can be achieved.

According to a preferred development of the invention, it is provided that the vibration of the measuring tube is minimal in a predetermined spatial direction, In particular, it is preferred that a function of the vibration of the measuring tube is minimal in at least two differing spatial directions.

According to the invention, such a production method is thus also provided for a Coriolis mass flowmeter having two measuring tubes and having two neighboring oscillation node plates that join both measuring tubes to one another characterized in that the angle between the planes of both oscillation node plates is determined in such a manner that the vibration of the measuring tube is minimal at a predetermined driving force.

According to a preferred development of the invention, the course of action according to this production method is, in particular, such that the vibration of the measuring tube is calculated, preferably using the finite element method. As in the previously described Coriolis mass flowmeter, it is also provided in the production method according to preferred developments that the vibration of the measuring tube is minimal in a predetermined spatial direction, and is particularly preferred that a function of the vibration of the measuring tube is minimal in at least two differing spatial directions.

BRIEF DESCRIPTION OF THE DRAWINGS

In the following, a preferred embodiment of the invention is described in detail using reference to the drawing. The drawing shows.

DETAILED DESCRIPTION OF AN ILLUSTRATIVE EMBODIMENT

Figure 1:
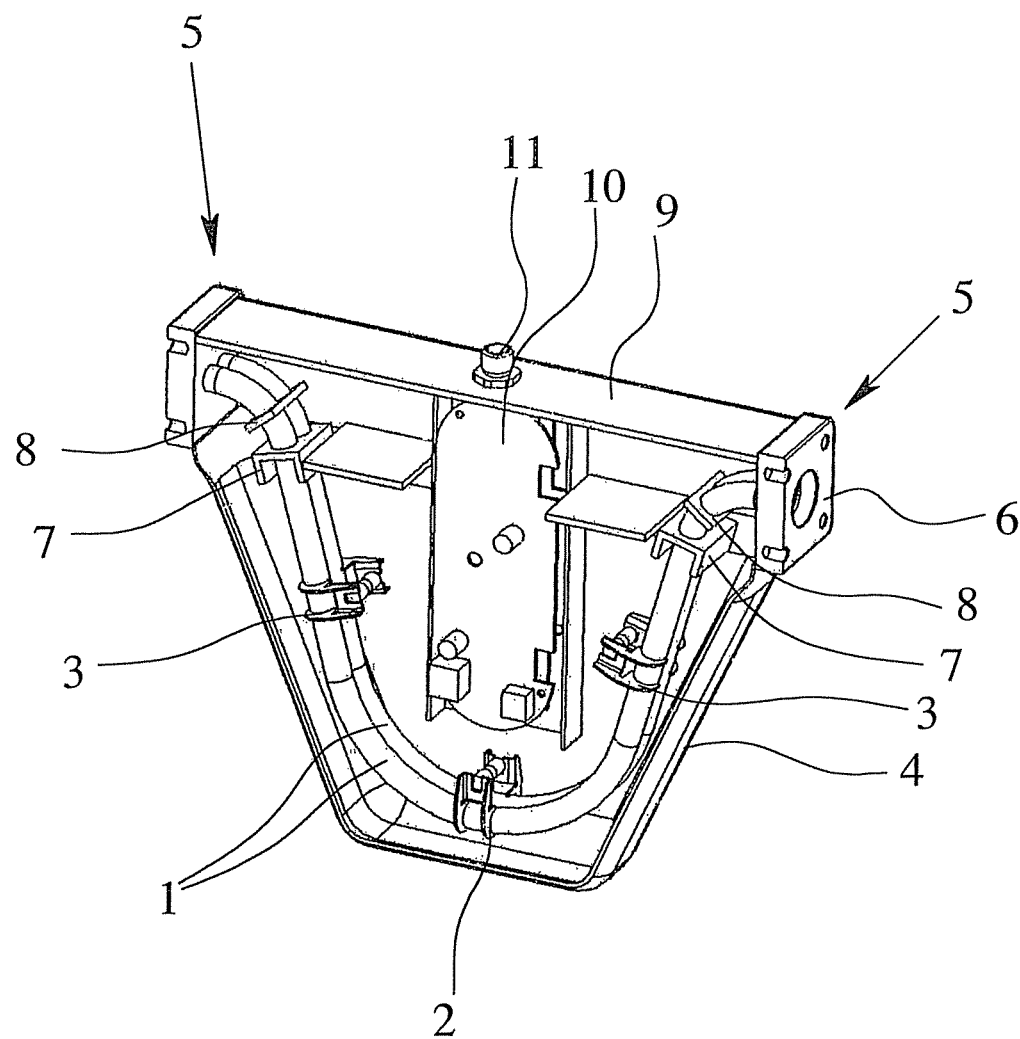
FIG. 1 a Coriolis mass flowmeter according to a preferred embodiment of the invention in a partially sectional, perspective view.

A Coriolis mass flowmeter according to a preferred embodiment of the invention can be seen in FIG. 1 that has two measuring tubes 1 that can be excited to oscillation, an oscillation driver 2 and two oscillation sensors 3. Both measuring tubes 1 run parallel to one another in a housing 4 of the Coriolis mass flowmeter and, in fact, in total have an essentially U-shaped course. An end connection plate and adapter 5 is provided on each end of the measuring tube 1, which, on the one hand, allows for access to the process pipeworks in which the Coriolis mass flowmeter is installed, namely using a flanged connection 6, and, on the other hand, allows for the connection of one pipe of the process pipeworks to both measuring tubes 1, i.e. serves as a flow splitter. It is essential here that the end connection and adapter plate 5 is made of one common component.

Two neighboring oscillation node plates 7, 8 are provided on the ends of the measuring tube 1. At the same time, a device with a rectangular cross section is provided as the outer oscillation node plate 8, while the neighboring oscillation node plate 7, which is farther away from the end connection plate and adapter 6, has a U-shaped profile. This U-shaped profile serves the purpose of separating the desired together and apart oscillation of the measuring tube 1 well in terms of frequency from undesired oscillation in a perpendicular plane.

Figure 2:
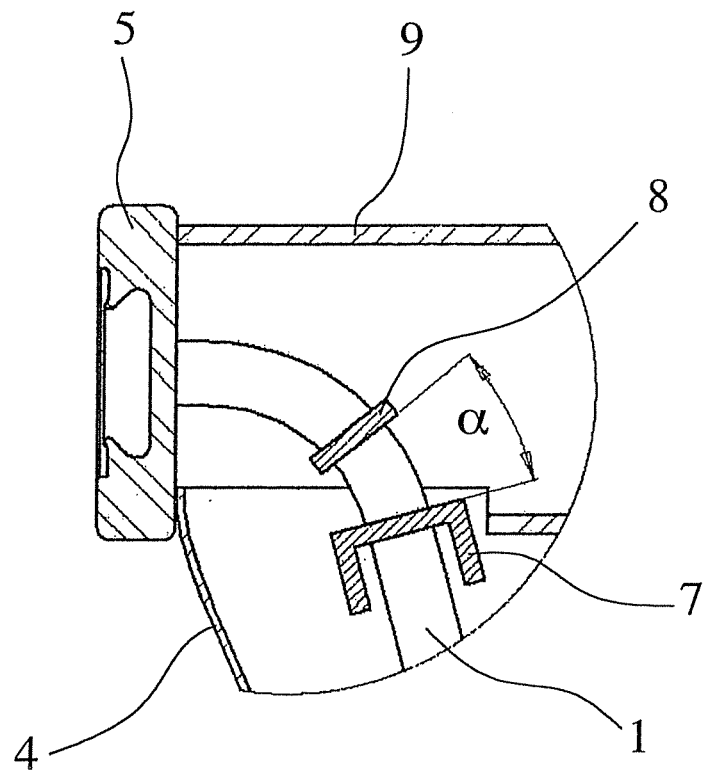
FIG. 2 the end area of the measuring tube of the Coriolis mass flowmeter according to a preferred embodiment of the invention in cross section.
Figure 3:
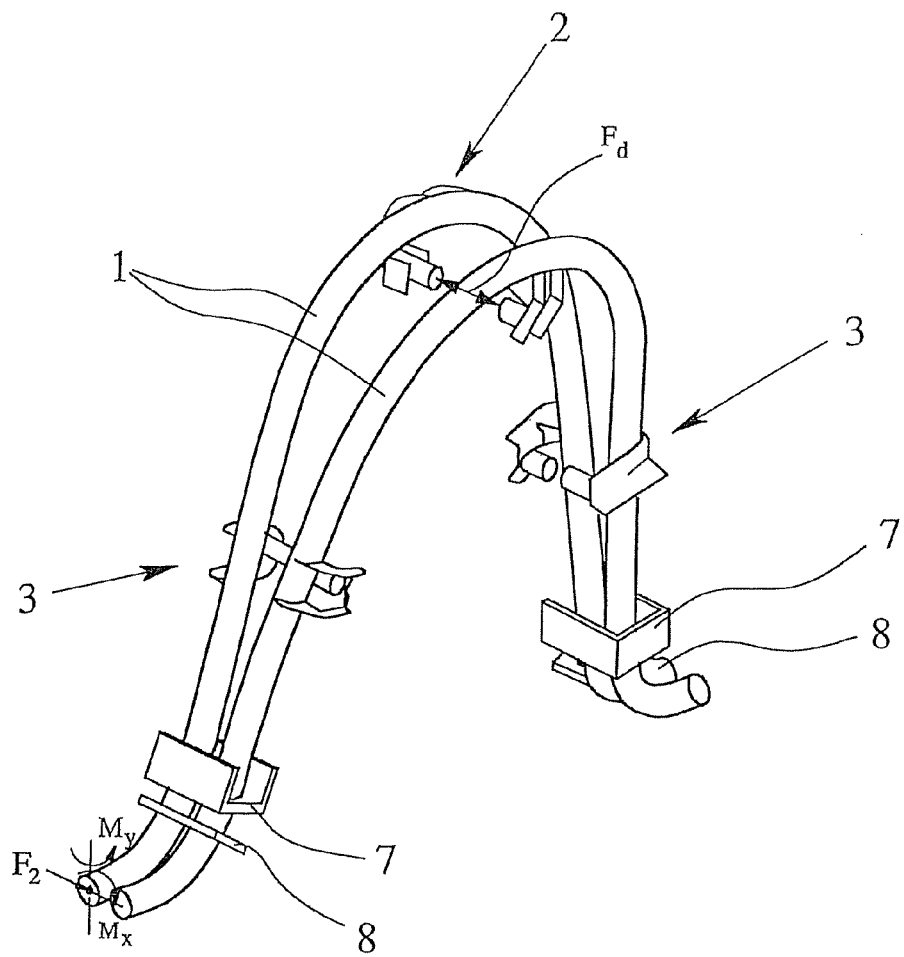
FIG. 3 diagram of the vibration of the measuring tube of the Coriolis mass flowmeter according to the preferred embodiment of the invention at a predetermined driving force.

A predetermined angle α is provided between the outer oscillation node plates 7 and the inner oscillation node plates 8, as can particularly be seen in FIG. 2. This angle α is determined in such a manner that at a predetermined oscillation excitation of the measuring tube 1, designated Fd in FIG. 3, minimal vibration of the measuring tube 1, designated F2, Mx, and My there, is achieved. The lateral vibration F2 and the torsional movement My and Mx of the measuring tube 1 are thus minimized.

Figure 4:
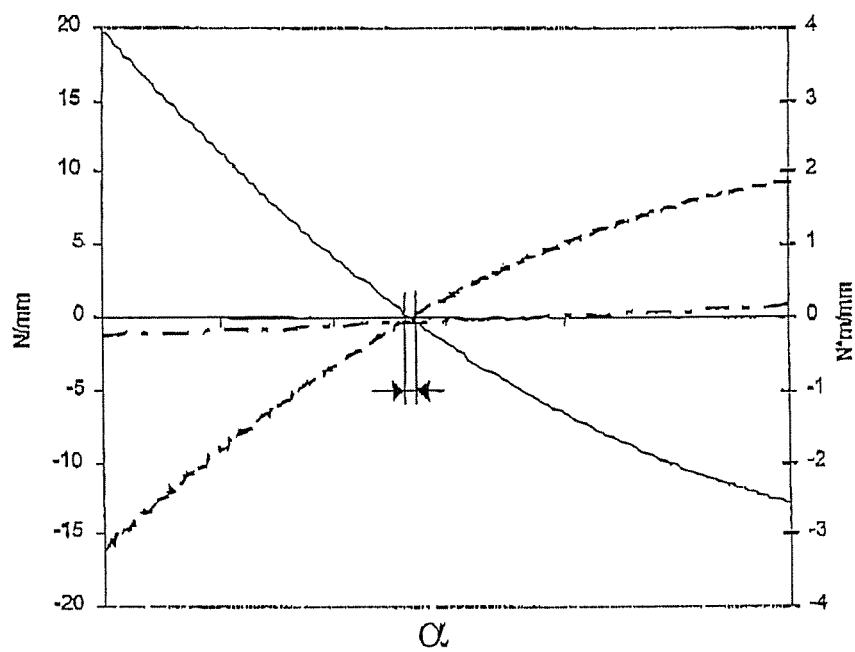
FIG. 4 a representation for determining the optimal angle between the oscillation node plates of the Coriolis mass flowmeter neighboring one another according to a preferred embodiment of the invention.

A finite element method is used for determining the angle α between the oscillation node plates 7, 8, which calculates which of the vibrations of the measuring tube 1 result at different angles α between the oscillation node plates 7, 8. The results are shown in FIG. 4, where it can be seen that an area for an optimal angle α results between the two arrows, in which vibrations are at a minimum.

A reinforcing bridge 9 is provided between the end connection plate and adapter 5 in the previously described Coriolis mass flowmeter according to the preferred embodiment of the invention. This serves the purpose of oscillation isolation of the Coriolis mass flowmeter. It is essential here, that the reinforcing bridge 9 is unrelated to the housing 4 of the Coriolis mass flowmeter, so that the housing 4 can be relatively easily implemented, while the reinforcing bridge 9 is made so stiff and solid that the requirements of oscillation isolation are precisely complied with. In this manner, a very lightweight Coriolis mass flowmeter is achieved. This is supported further in that the reinforcing bridge 9 is designed as a hollow plate, which has nearly the same stiffness as a corresponding solid plate, but is considerably lighter.

The electronic converter 10 of the Coriolis mass flowmeter is provided within the housing 4. In fact, the entire converter 10 is actually arranged within the housing 4 so that no components of the converter 10 are required outside of the housing 4. The electric connection of the converter 10 takes place using an electric plug 11 that is led through the reinforcing bridge 9, which also incidentally, for its part, supports the entire converter 10.

Figure 5:
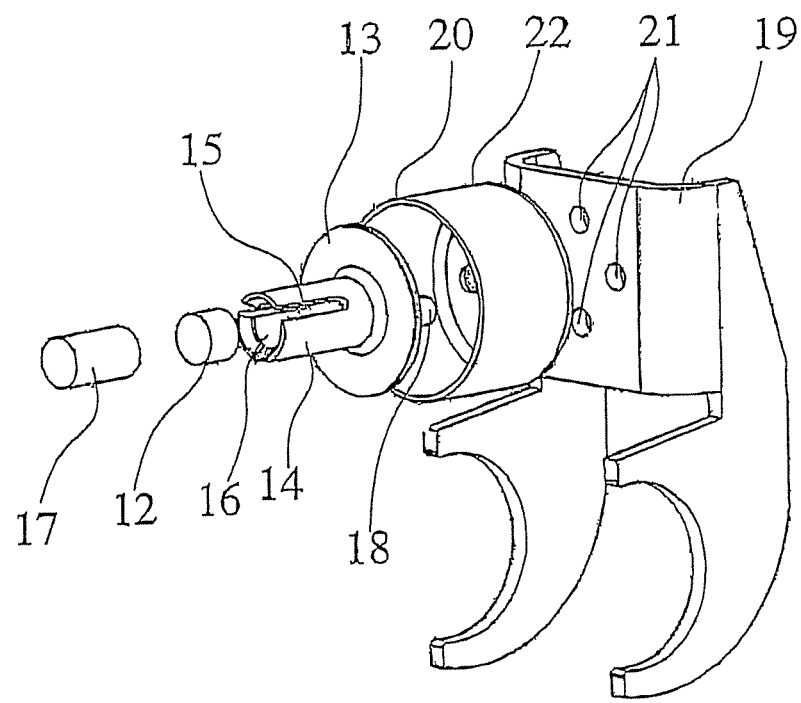
FIG. 5 a perspective representation of a part of the oscillation driver of the Coriolis mass flowmeter according to a preferred embodiment of the invention.

Finally, how the oscillation driver 2 and the oscillation sensor 3 are designed in detail is shown in FIG. 5, namely in particular, in view of a permanent magnet 12 provided therefor. This permanent magnet 12 functions in the known manner with a coil, not shown, in order to achieve an excitation of oscillation in the measuring tube 1 or, respectively to register oscillation of the measuring tube 1. A magnet holder 13 is provided for the permanent magnet 12, into which the permanent magnet 12 is inserted. The magnet holder 13 is essentially designed as a hollow cylinder, wherein its walls 14 have slots 15, so that the walls 14 are flexible. "Snap-fit" notches 16 are provided on the upper ends of the walls 14, so that a permanent magnet 12 inserted into the magnet holder 13 is held by means of a catch mechanism. According to the above-described preferred embodiment of the invention, a cylinder-shaped permanent magnet 12 is used together with a likewise cylinder-shaped metal pole 17, which, as seen in FIG. 5, is inserted into the magnet holder 13.

The magnet holder 13, itself, is manufactured of a plastic material and has pegs 18 on its base 20 with which it can be attached to a holding device 19 of the oscillation driver 2 or, respectively to the oscillation sensor 3. Attachment is carried out by means of molding. For this, the plastic pegs 18 formed on the magnet holder 13 are placed into the holes 21 provided on the holding device 19 and pushed through them in order to then heat the ends that were pushed through the holes 21 of the holding device and provide them with a crown that prevents sliding out of the holes 21, so that a fixation of the magnet holder 13 to the holding device 19 is achieved. In addition, a shell 22 is provided for mechanical protection of this device, which is placed between the magnet holder 13 and the holding device 19.

The invention claimed is:
1. A Coriolis mass flowmeter, comprising:
a first measuring tube and a second measuring tube configured to be excited to oscillations, wherein the first measuring tube and the second measuring tube run parallel to each other in a housing of the Coriolis mass flowmeter;
a first oscillation node plate positioned at a first point on one end of the first measuring tube and the second measuring tubes, wherein the first oscillation node plate connects the first measuring tube and the second measuring tube to one another; and a second oscillation node plate positioned at a second point on the one end of the first measuring tube and the second measuring tube, wherein the second oscillation node plate connects the first measuring tube and the second measuring tube to one another, wherein a selected angle is created between a plane of the first oscillation node plate and a plane of the second oscillation node plate, wherein the selected angle is optimized for a predetermined driving force, and wherein at the predetermined driving force minimal lateral vibration and torsional movement of the measuring tubes between an adapter and the node plates is achieved due to the selected angle.

2. The Coriolis mass flowmeter according to claim 1, wherein the vibrations of the measuring tube are reduced in a predetermined spatial direction.

3. The Coriolis mass flowmeter according to claim 1, wherein a function of the vibrations of the measuring tube are reduced in at least two differing spatial directions.

4. A method for producing a Coriolis mass flowmeter, comprising:

maintaining a first measuring tube and a second measuring tube configured to be excited to oscillations, wherein the first measuring tube and the second measuring tube run parallel to each other in a housing of the Coriolis mass flowmeter;

determining, by a numerical technique finite element method, vibrations between a first oscillation node plate and a second oscillation node plate and an adapter at a plurality of different angles between a plane of the first oscillation node plate and a plane of the second oscillation node plate;

positioning the first oscillation node plate at a first point on one end of the first measuring tube and the second measuring tube, wherein the first oscillation node plate connects the first measuring tube and the second measuring tube to one another;

positioning a second oscillation node plate at a second point on the one end of the first measuring tube and the second measuring tube, wherein the second oscillation node plate connects the first measuring tube and the second measuring tube to one another and wherein a selected angle is created between a plane of the oscillation plate and a plane of the second oscillation node plate.

5. The method for producing a Coriolis mass flowmeter according to claim 4, wherein the vibrations of the measuring tubes are reduced in a predetermined spatial direction.

6. The method for producing a Coriolis mass flowmeter according to claim 4, wherein a function of the vibrations of the measuring tubes are reduced in at least two differing spatial directions.

* * * * *